US007563162B2

(12) United States Patent
Lawson et al.

(10) Patent No.: US 7,563,162 B2
(45) Date of Patent: Jul. 21, 2009

(54) GAME OF CHANCE

(75) Inventors: Eric J. Lawson, Shawnee, OK (US); James R. Skaggs, Shawnee, OK (US)

(73) Assignee: Planet Bingo, Inc., Rancho Mirage, CA (US)

(*) Notice: Subject to any disclaimer, the term of this patent is extended or adjusted under 35 U.S.C. 154(b) by 0 days.

(21) Appl. No.: 10/767,504

(22) Filed: Jan. 28, 2004

(65) Prior Publication Data

US 2005/0164763 A1 Jul. 28, 2005

(51) Int. Cl.
*G06F 17/00* (2006.01)

(52) U.S. Cl. .............................. 463/16; 700/90; 700/91

(58) Field of Classification Search ................... 463/17, 463/25, 29; 700/91–93

See application file for complete search history.

(56) References Cited

U.S. PATENT DOCUMENTS

| | | | | | |
|---|---|---|---|---|---|
| 4,692,863 | A | * | 9/1987 | Moosz | 463/18 |
| 5,283,734 | A | * | 2/1994 | Von Kohorn | 463/17 |
| 6,015,345 | A | * | 1/2000 | Kail | 463/16 |
| 6,024,641 | A | * | 2/2000 | Sarno | 463/17 |
| 6,186,502 | B1 | * | 2/2001 | Perkins | 273/138.1 |
| 6,296,250 | B1 | * | 10/2001 | Langan | 273/139 |
| 6,325,721 | B1 | * | 12/2001 | Miyamoto et al. | 463/40 |
| 6,669,565 | B2 | * | 12/2003 | Liegey | 463/42 |
| 6,688,976 | B1 | * | 2/2004 | Tulley et al. | 463/17 |
| 6,910,965 | B2 | * | 6/2005 | Downes | 463/28 |
| 2003/0184012 | A1 | * | 10/2003 | Green | 273/139 |
| 2003/0199315 | A1 | * | 10/2003 | Downes | 463/28 |
| 2004/0009816 | A1 | * | 1/2004 | Miller | 463/42 |
| 2004/0029627 | A1 | * | 2/2004 | Hannan et al. | 463/1 |
| 2004/0059655 | A1 | * | 3/2004 | Seifert et al. | 705/35 |
| 2004/0063484 | A1 | * | 4/2004 | Dreaper et al. | 463/16 |
| 2004/0111170 | A1 | * | 6/2004 | Hasday | 700/91 |
| 2004/0229675 | A1 | * | 11/2004 | Cannella | 463/16 |
| 2005/0093228 | A1 | * | 5/2005 | Brian, III | 273/138.1 |
| 2005/0137728 | A1 | * | 6/2005 | Guagliardo | 700/91 |

* cited by examiner

*Primary Examiner*—Ronald Laneau
*Assistant Examiner*—Tramar Harper
(74) *Attorney, Agent, or Firm*—Jeffrey D. Moy; Weiss & Moy, P.C.

(57) ABSTRACT

A method of a game of chance wherein the measured performances of at least two participants in the subject of the game of chance are combined to determine a winner.

15 Claims, 5 Drawing Sheets

GAME OF CHANCE

BACKGROUND OF THE INVENTION

1. Field of the Invention

This invention relates to a game of chance based on specific events, and more particularly, but not by way of limitation, to a game of chance which includes an entry fee and a payout for the winner based on the results of a specified sporting event.

2. Discussion

Sports parlays are well known in the art. A parlay is simply a single wager on multiple propositions. To win a parlay, a bettor must select the winning side of each proposition.

Football parlay cards, which are especially common, offer a chance to win substantial sums of money with very little risk. For a selected group of football games, each game (sometimes also referred to herein as a matchup) constitutes a proposition. To win a football parlay, the bettor must select the winner of each matchup. Point-spreads are applicable in determining a winning proposition. The payout odds increase based on the number of propositions in the parlay. The bettor must win all propositions in the bet in order to win a parlay, unless specifically indicated in a particular parlay's rules. Typically, online parlay cards offer 2 to 8 propositions, although several shops accept football cards with as many as 12 combinations (with a payoff of 2000 to 1). As used herein, the term "football parlay card" means a card which includes a group of propositions wherein each proposition is a football game (i.e., a matchup) between two football teams.

While football parlays are popular, the bettor must choose the winner of each matchup (i.e., proposition) based on the bettor's expertise. For each matchup, the bettor must take into account such factors as the point-spread, injuries to team personnel, site of the game, weather conditions, and win-loss record of each team. Thus football parlay bettors tend to be dedicated football enthusiasts who are willing to spend the time and effort to make a decision as to the winner of each matchup.

Football pools are also known in the art. In a typical football pool, each participant pays a specified amount and enters the participant's name in one square on a 10 by 10 grid. After all squares are sold, one of the teams is assigned to the columns and the other team is assigned to the rows. Numbers from 0 to 9, inclusive, are randomly assigned (usually be drawing numbers on scraps of paper) to each row and each column. The winner is the person whose name is in the square corresponding to the score, wherein only the last number in the score is considered. Variations include splitting the pot so that a winner receives a payout based on the score at the end of the first quarter, the score at the end of the second quarter, the score at the end of the third quarter, and the score at the end of the game. Unlike football parlays, participants in football pools do not require special knowledge because the specific block chosen by a participant will correspond to a score which is randomly determined.

While football pools are simple to administer, they normally apply only to a single matchup. For the illustration set forth above, the pool is limited to 100 participants. Moreover, the nature of football pools requires the participant to be present to select a square. To prevent participants from trying to select preferred numbers based on unique scoring multiples, the numbers are usually drawn only after all squares in the grid are sold.

Until now, no game of chance provided the ease of participation found in typical football pools coupled with payouts normally associated with football parlay cards.

SUMMARY OF THE INVENTION

Applicants' invention provides a method and apparatus for a game of chance wherein, for a particular subject, wherein the subject can be either a single event or a series of related events, the entrant pays an entry fee and is eligible to receive a payout based on predetermined criteria.

DETAILED DESCRIPTION OF THE INVENTION

Figure 1:
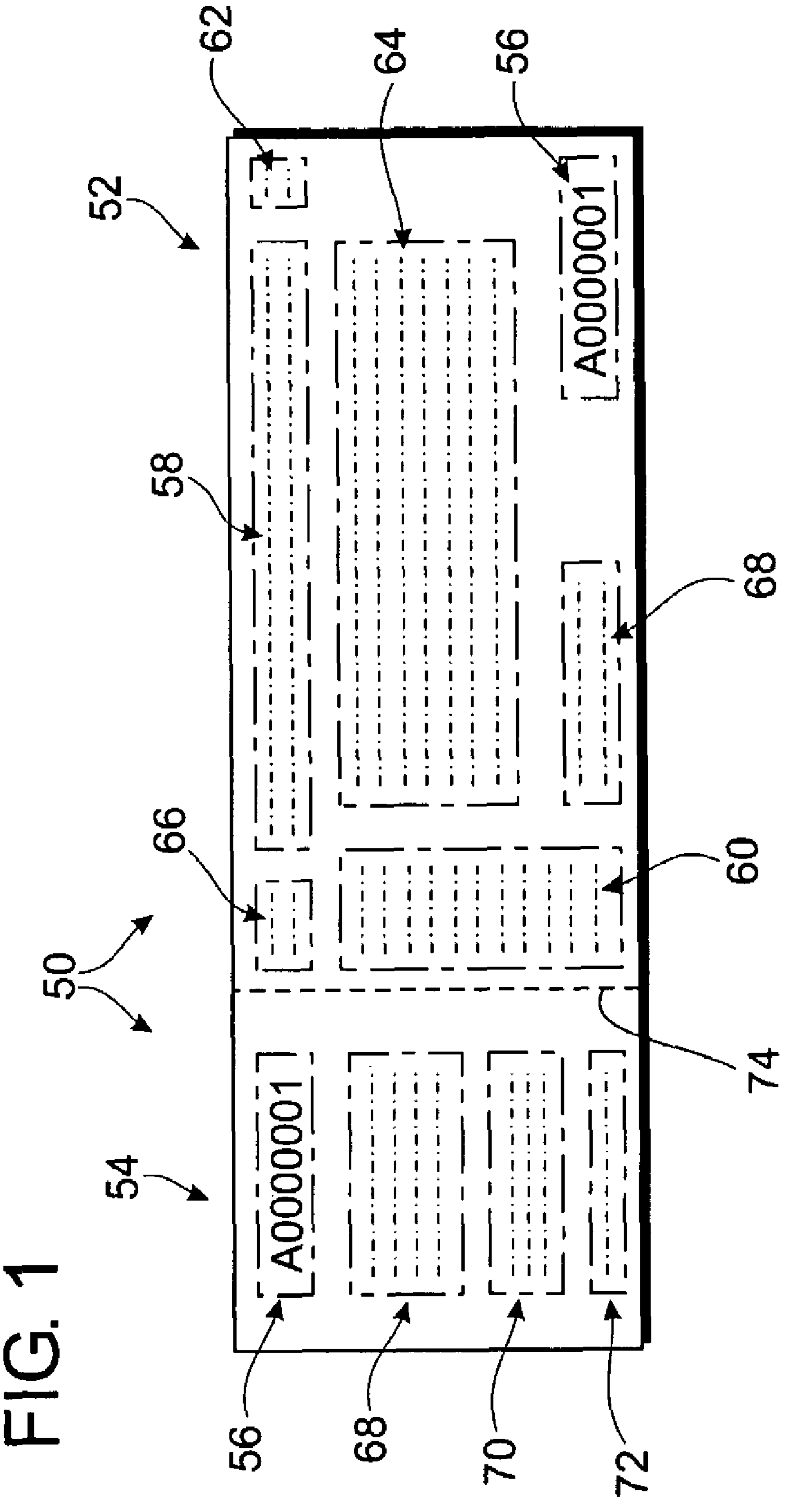
FIG. 1 shows a game record generated in accordance with applicants' invention wherein the game record includes an entrant record (to the right) and an administrative record (to the left) and a perforation therebetween.

Referring now to FIG. 1, a game record 50 generated in accordance with applicants' invention has an entrant record portion 52 and an administrative record portion 54. The entrant record portion 52 includes a unique ticket identifier 56 which also appears on the administrative record portion 54. An entrant payout chart 58 provides a record of the entrant's assigned payout holding. A subject participant identification chart 60 lists the subject participants and a corresponding participant identifying number for each subject participant.

Still referring to FIG. 1, an entry fee record portion 62 shows the entry fee paid by the entrant in exchange for an opportunity to receive a payout. A game rules record portion 64 provides selected information about the game of chance, and a game information record portion 66 provides additional information relating to the game of chance according to applicants' invention. A player information record portion 68 provides record of the player's contact information. An identical player information record box 68 also appears on the administrative record 54 of the game record 50.

Still referring to FIG. 1, appearing on the administrative record portion 54 of the game ticket 50 are a second game information record portion 70 and a third game information record portion 72. A perforation 74 facilitates detachment of the entrant record portion 52 from the administrative record portion 54.

Figure 2:
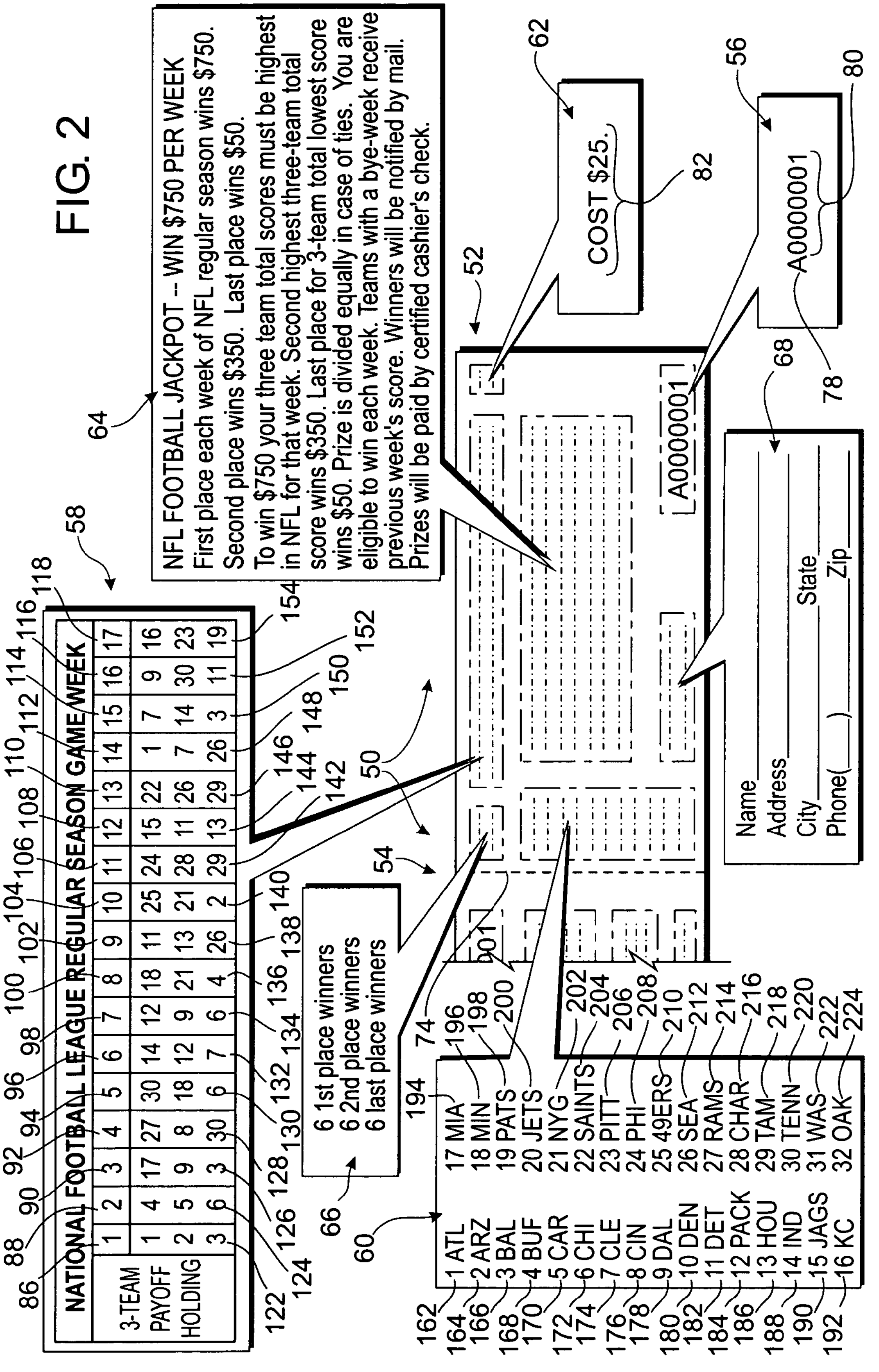
FIG. 2 provides details of the entrant record portion of the game record shown in FIG. 1.

Referring now to FIG. 2, shown therein are the contents of the game entrant record portion 52 of the game record 50. The game record identifier 56 provides an alphanumeric identifier 76 consisting of a record set prefix 78 in combination with a record number 80. For purposes of this illustration, the record set prefix "A" indicates the game record 50 is record #1 of a set A of game records 50. For subsequent game sets, the record set prefix would be B, C, D, etc.

Still referring to FIG. 2, the entrant payout chart 58 lists, for games played by National Football League teams over the 17 weeks of the regular season, the three teams for which the holder of the game record 50 will receive payment each week, provided the total the scores of the three designated teams is either the highest (first place) or the second highest (second place), or the lowest (last place).

It will be understood by one skilled in the art that the number of permutations involving three teams from a total of 32 teams is mathematically determinable as a permutation. Permutation involves selecting a group of elements (r) from the total available elements (n) and arranging them (r) in a certain order. The symbol for permutation is usually nPr, where n is the total items (elements) available and r is the number of items picked (selected and arranged) at a time without Replacement®<n). nPr is calculated using the following formula:

$$nPr = \frac{n!}{(n-r)!} = \frac{(32\times 31\times 30)\times 29!}{(32-3)!} = \frac{(32\times 31\times 31)\times 29!}{29!} = 32\times 31\times 30$$

In the National Football League regular season, the subject of the game of chance according to applicants' invention consists of the games played each week between the subject participants (i.e., the 32 National Football League teams). Thus, a total of 29,760 unique game records 50 provide every possible 3-team permutation for each week of National Football League games.

Still referring to FIG. 2, the entrant payout chart 58 includes a game subject set identifier 84. In the game record 50 according to applicants' invention the game subject set identifier 84 consists of the text "National Football League Regular Season Game Week." Game subject identifiers 86, 88, 90, 92, 94, 96, 98, 100, 102, 104, 106, 108, 110, 112, 114, 116, and 118 correspond to text 1, 2, 3, 4, 5, 6, 7, 8, 9, 10, 11, 12, 13, 14, 15, 16, and 17, respectively, so that the first game subject consists of games played during the first week of regular season games of the National Football League.

Still referring to FIG. 2, payout holding text 120 in the entrant payout chart 58 indicates the entrant's payout holding by means of entrant's payout holding identifiers. The 3-team payout holding for each game subject appears directly beneath the game subject identifier. According to the entrant payout chart 58, the entrant having the game record 50 identified by the game record identifier 56 has a payout holding identifier 122 (1, 2, and 3) for games played during the first week of the regular season of the National Football League, a payout holding identifier 124 (4, 5, and 6) for games played during the second week, and so on, so that payout holding identifiers 126, 128, 130, 132, 134, 136, 138, 140, 142, 146, 148, 150, 152, and 154 are payout holding identifiers for games played during weeks, 3, 4, 5, 6, 7, 8, 9, 10, 11, 12, 13, 14, 15, 16, and 17, respectively, of the regular season of the National Football League.

Still referring to FIG. 2, the subject participant identification chart 60 provides a subject participant identifier for each participant in the subject of the game of chance according to applicants' invention. The subject participant identifier 162 consists of the text entry "1 ATL" to indicate that subject participant team 1 (See the entrant payout chart 58) refers to the Atlanta Falcons. Subject participant identifiers 164, 166, 168, 170, 172, 174, 176, 178, 180, 182, 184, 186, 188, 190, 192, 194, 196, 198, 200, 202, 204, 205, 208, 210, 212, 214, 216, 218, 220, 222, and 224 correspond to the Arizona Cardinals, the Baltimore Ravens, the Buffalo Bills, the Carolina Panthers, the Chicago Bears, the Cleveland Browns, the Cincinnati Bengals, the Dallas Cowboys, the Denver Broncos, the Detroit Lions, the Green Bay Packers, the Houston Texans, the Indianapolis Colts, the Jacksonville Jaguars, the Kansas City Chiefs, the Miami Dolphins, the Minnesota Vikings, the New England Patriots, the New York Jets, the New York Giants, the New Orleans Saints, the Pittsburgh Steelers, the Philadelphia Eagles, the San Francisco Forty Niners, the Seattle Seahawks, the St. Louis Rams, the San Diego Chargers, the Tampa Bay Buccaneers, the Tennessee Titans, the Washington Redskins, and the Oakland Raiders, respectively. Each payout holding identifier 126, 128, 130, 132, 134, 136, 138, 140, 142, 146, 148, 150, 152, and 154 thus includes three National Football Teams corresponding to the three National Football Teams whose subject participant identifiers appear in the entrant's payout holder identifiers 122, 124, 126, 128, 130, 132, 134, 136, 138, 140, 142, 144, 146, 148, 150, 152, 154 in the entrant payout chart 58.

Still referring to FIG. 2, the entry fee record portion 62 contains text 82 indicating the entry fee (in this case, $25.00). It will be understood by one skilled in the art that more than one game of chance according to applicants' invention can take place simultaneously. For example, one game can be a $5 game, another game can be a $50 game, and yet another game can be a $20 game. According to applicants' invention, the payout can vary with the ticket price 62.

Still referring to FIG. 2, the game rules record portion 64 provides information about the rules of applicants' game of chance. The text in the game rules record portion 64 establishes payout ($750 for first place, $350 for second place, and $50 for last place) and defines performance criteria (highest 3-team total score for first place and second place, lowest 3-team score for last place). The text in the game rules record portion 64 also addresses ties, bye weeks, winner notification, and form of payment.

Still referring to FIG. 2, the game information record portion 66 contains text which relates additional useful, but not critical, information about applicants' game of chance invention. According to the information contained therein, 6 first-place winners, 6 second-place winners, and six last-place winners will receive a payout according to the predetermined rules set forth in the game rules record portion 64. Multiple first-place winners, second-place winners, and last-place winners are possible, according to applicants' game of chance illustrated in FIG. 2, because each predetermined performance criteria for which a payout will occur (i.e., the highest 3-team total score, the second-highest 3-team total score, and the lowest 3-team total score), can occur in six different combinations (e.g., 1-2-3, 1-3-2, 2-1-3, 2-3-1, 3-1-2, and 3-2-1 for first place).

Still referring to FIG. 2, the player information record portion 68 provides a place for the entrant to record the entrant's contact information.

It will be understood by one skilled in the art that the only essential information on the game entrant retention portion 52 of the game record 50 according to applicants' invention is the game record identifier 56 which corresponds to the contents of a single entrant payout chart 58. All other items appearing on the game entrant retention portion 52 of the game record 50 can be posted in other locations, e.g., on the internet, on posters located at the point of receipt of the entry fee, or by separate written materials.

Figure 3:
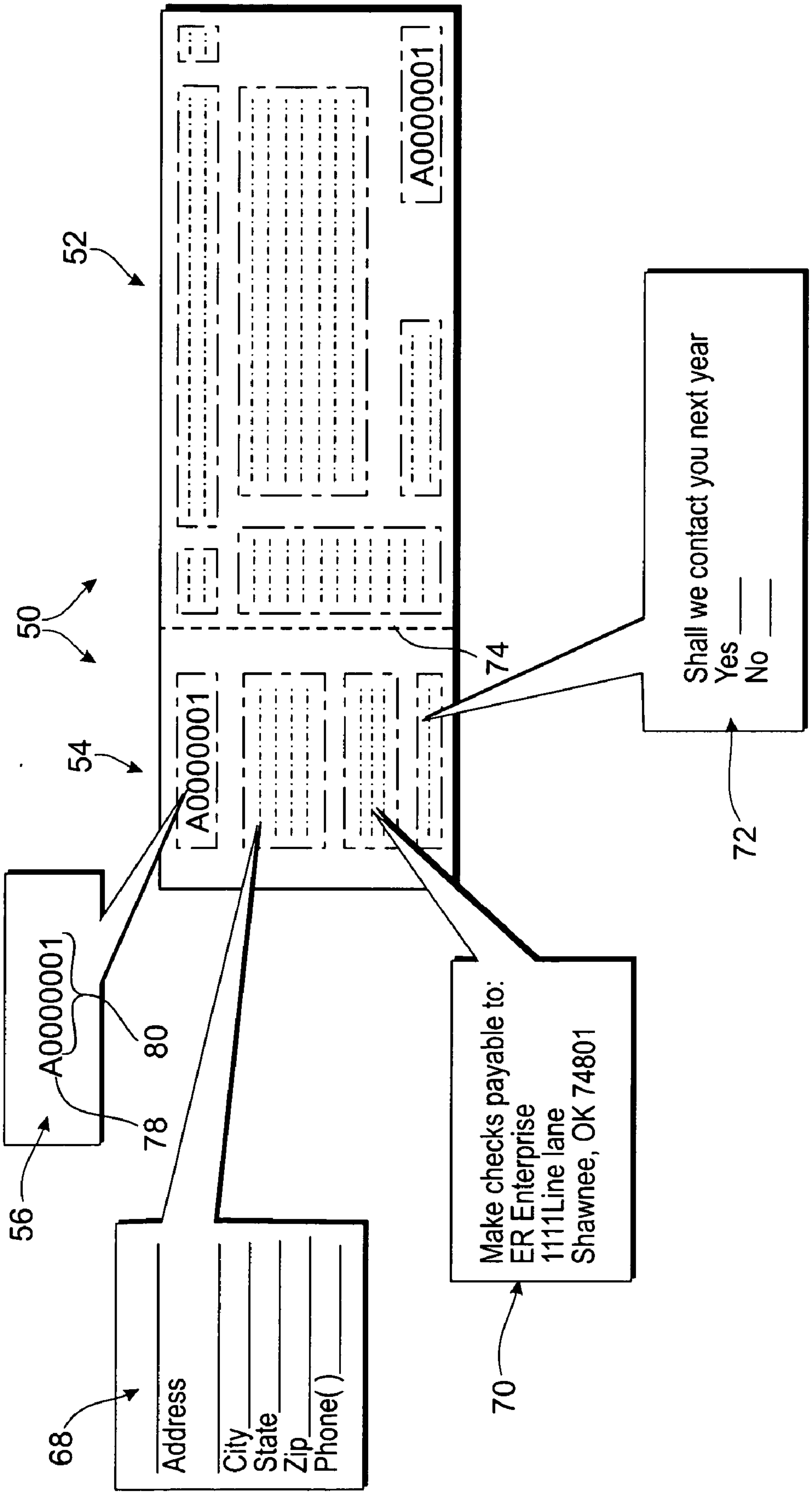
FIG. 3 provides details of the administrative record portion of the game record shown in FIG. 1.

Referring now to FIG. 3, the game administrative record portion 54 of the game record 50 includes, as a minimum, the unique game record identifier 56 which mirrors the game record identifier 56 on the entrant retention portion 52 of the game record 50. Optionally, the game administrative record portion 54 can also contain contact information about the entrant (mirroring player information box 68), a second game information record portion 70 and a third game information record portion 72.

Figure 4:
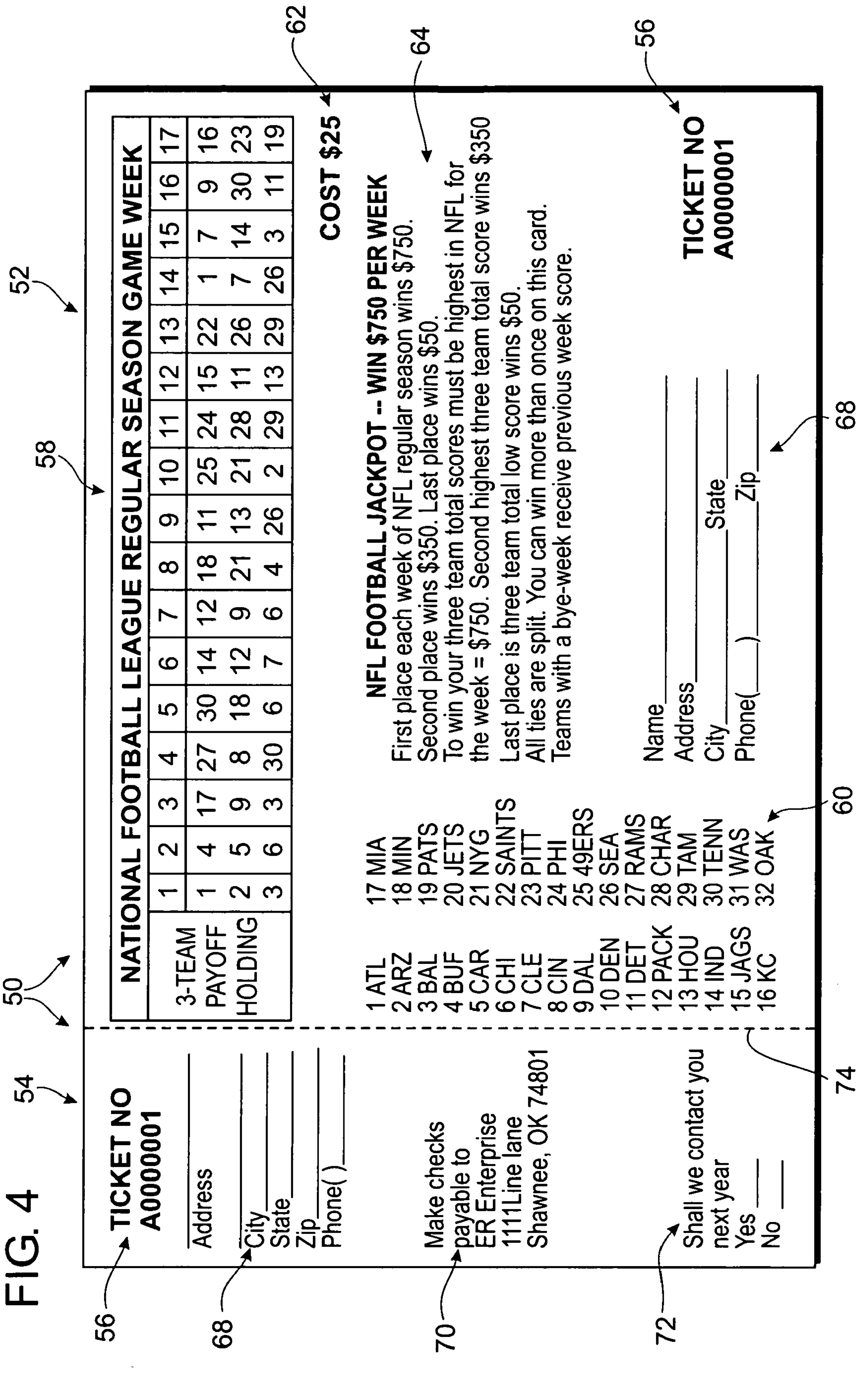
FIG. 4 is an enlarged view of a prototypical game record according to applicants' invention, wherein a payout is based on the total score of teams in the National Football League.

Referring now to FIG. 4, an enlarged view (not to scale) of the game record 50 shown in FIG. 1 illustrates the contents of a game record 50 for a game of chance according to applicants' invention wherein the game of chance subject consists of National Football League regular season games taking place in weekly matchups and the game subject set consists of 17 weeks of regular season contests between National Football League teams.

It will be understood by one skilled in the art that applicants' invention is not confined to any particular sport or to a sport having multiple events. Applicants' invention can be used for a game of chance wherein the game subject is a single event such as a marathon (e.g., the Boston Marathon or the New York Marathon), by defining the subject participants (e.g., the first 100 entrants in open class with a previous best time less than a specified determinant), establishing the criteria for determining a winner (e.g., the lowest combined times for any three entrants), determining the entry fee, determining the number and amount of payouts, creating a game record for each permutation of participants having a combined time, matching a game record identifier to each permutation of participants whose time will be combined for purposes of the game of chance, receiving the entrant's entry fee, providing the entrant with the entrant's game record identifier, and providing the entrant with access to an entrant payout chart which contains the entrant's payout holding.

Figure 5:
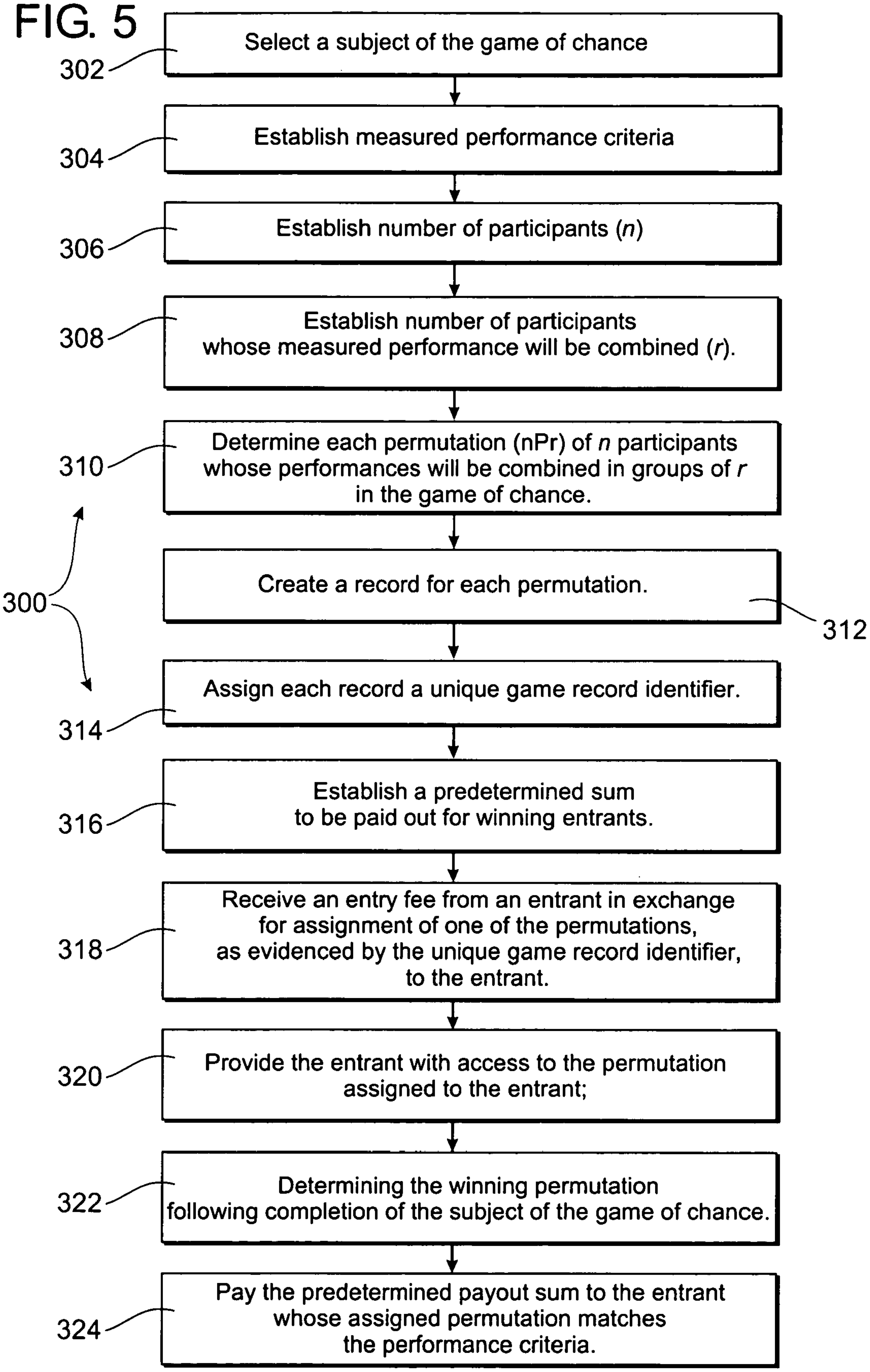
FIG. 5 is a flow chart showing a method of playing the game of the present invention.

Referring now to FIG. 5, shown therein, in the form of a flowchart, is a method 300 of the game of chance according to applicants' invention. A step of selecting a subject of the game of chance 302 is a necessary first step. In the game of chance illustrated in FIGS. 1-4, the subject consists of the regular season games played by National Football League teams on a designated game week. According to applicants' invention, the game of chance is adaptable to subjects as diverse as marathons, other track and field events, horse races, automobile races, golf tournaments, presidential primaries.

Still referring to FIG. 5, a step of selecting measured performance criteria 304 requires the administrator to predetermine a measurable criteria, e.g., lowest time to complete a marathon, finish (e.g., first, second, or third) in a marathon, distance achieved in a long jump competition, height successfully cleared in a pole vault competition, finish (e.g., first, second, or third) in a horse race or automobile race, lowest number of strokes in a golf tournament, finish (e.g., first, second, or third) in a golf tournament, total number of votes in a particular presidential primary, points scored (first, second, last) in a group of preselected football games, total yards (first, second, last) in a group of preselected football games, first downs in a group of preselected football games.

The number of participants (n) must be established in a step participant quantification step 306. For the illustration used in FIGS. 1-4, the number of participants is the number of teams in the National Football League. For a horse race, if the subject of the game of chance is a single race, the number of participants equals the number of horse entered in the race. If the subject of the game of chance is all horse races run on a particular day at a particular track, the number of participants equals the number of all horses entered in all races. It will be understood by one skilled in the art that the number of permutations based on (n) participants taken in combinations of (r) increases dramatically as the number of participants (n) increases.

The game of chance according to applicants' invention requires the step of establishing the number of participants (r) whose measured performance will be combined in a combined participant determination step 308. It will be understood by one skilled in the art that the number of permutations based on (r) participants taken in combination increases as the number of participants taken in combination r increases.

Still referring to FIG. 5, after the number of participants n and the number of participants whose measured performance will be taken in combination rare established, the number and contents of each permutation must be determined according to a permutation calculation and identification step 310. It will be understood by one skilled in the art that the number of permutations is determined mathematically, while the actual combinations can be generated efficiently computer programs known in the art.

Still referring to FIG. 5, a record creating step 312 involves creating a record of the contents of each permutation generated in the permutation calculation and identification step 310. In a record associating step 314, each record created in the record creating step 312 is assigned a unique game record identifier. See the unique game record identifier 76 illustrated in FIGS. 1-4.

Still referring to FIG. 5, in a payout establishment step 316, a predetermined sum is established as a payout to be paid to winning entrants. The amount of the predetermined payout established in the payout establishment step 316 is a judgment call to be made by the administrator of the game of chance. As the number of permutations established in the permutation calculation and identification step 310 increase, the number of entrants increases. The administrator, as a business judgment, will establish payouts and payout amounts which encourage entrants to pay the entry fee in hopes of winning a substantial payout for a relatively low entry fee.

In an entry fee receiving step 318, the game administrator receives an entry fee from an entrant in exchange for assignment of one of the permutations, as evidenced by the unique game record identifier, to the entrant. In an access providing step 320, the entrant is provided access to the permutation (referred to as a payout holding above) assigned to the entrant.

Still referring to FIG. 5, in order to know his payout holding, the entrant must be provided access to the permutation assigned to him and corresponding to the permutation's unique game record identifier. This is accomplished in an access providing step 320. In the game of chance illustrated in FIGS. 1-4, the game entrant retention record 52 provides the entrant with both the game record identifier 76 and the entrant's payout holding 122, 124, 126, 128, 130, 132, 134, 136, 138, 140, 142, 144, 146, 148, 150, 152, 154 for each week of National Football League regular season games (See FIG. 2).

Based on completion of the subject of the game of chance according to applicants' invention, the winning permutation is determined in a winning permutation determination step 322. In a final payout step 324, the predetermined payout sum is paid to the entrant whose permutation matches the performance criteria.

It will be clear to one skilled in the art that applicants' game of chance does not require a paper record as illustrated in FIGS. 1-4. Each step set forth in FIG. 5 can be carried out by a computer. If desired, every step can be carried out by a computer. The entrant can observe the game rules over the internet, pay by credit card over the internet, receive confirmation of an assigned unique game record identifier over the internet, access the assigned permutation corresponding to the entrant's unique game record identifier over the internet, print out a game entrant record portion (if desired), and receive payment directly to the entrant's bank account (if desired).

It will also be clear to one skilled in the art that applicants' game of chance can be set up by computer with all records maintained in a computer database for access by the entrant to determine the entrant's payout holding. For this reason, the term "record," as used herein, includes records which exist only in a database on a server at a remote site, so that the entrant accesses the database and, based on the entrant's unique game record identifier, the entrant obtains the corresponding payout holding.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A method of conducting a game of chance by a game of chance administrator wherein an entrant pays an entry fee and obtains a chance to win a predetermined, specified currency amount, said method comprising the steps of:

selecting a subject of said game of chance, said game of chance having a plurality of game playing identifiers over a predetermined regular season time frame;

wherein said subject of said game of chance is a combined outcome of one of a plurality of randomly selected individuals playing in a specified individual sporting event during said predetermined regular season time frame or a plurality of randomly selected team sports games occurring on a specified day of said predetermined regular season time frame, each of the plurality of game playing identifiers over a predetermined regular season time frame being one of a plurality of randomly selected individuals playing in a specified individual sporting event or a plurality of randomly selected team sports games occurring on a specified day;

establishing measured performance criteria relating to said subject of said game of chance;

establishing a number of participants n in said subject of said game of chance;

establishing a number of participants r whose measured performance will be combined for purposes of said game of chance;

determining each permutation nPr of n participants whose performances will be combined in groups of r in said game of chance;

creating a game record for each said permutation, the number of game records limited to the number of permutations;

assigning each said game record a unique game record identifier;

establishing a predetermined specified currency amount as a payout sum to be paid out to winning entrants with respect to each of the plurality of game playing identifiers;

creating a game record having each of said unique game record identifier and said plurality of game playing identifiers over said predetermined regular season time frame;

receiving said entry fee from an entrant in exchange for assignment to the entrant of one of said permutations, as evidenced by said unique game record identifier;

providing said entrant with said visual game record;

determining the at least one winning permutation following the events on which the game of chance is based; and paying said predetermined specified currency amount as a fixed payout sum to two or more entrants holding winning permutations for a specific game playing identifiers over a predetermined regular season time frame wherein the winning permutations are one of a total highest finish of said plurality of randomly selected individuals playing in a specified individual sporting event or a total highest point total scored by said plurality of randomly selected team sports games occurring on a specified day.

2. The method of claim 1, wherein said visual game record further comprises:

a game entrant record portion having said unique game record identifier printed thereon;

a game administrative record portion having said unique game record identifier printed thereon; and a perforation separating said game entrant record portion from said game administrative record portion, so that said game entrant record portion is retained by the entrant and said game administrative portion is retained by the game administrator.

3. The method of claim 1, wherein said game entrant record portion has an entrant payout chart printed thereon, said entrant payout chart including at least one said permutation assigned to the entrant, said permutation corresponding to said unique game record identifier.

4. The method of claim 1, further comprising an additional step of combining at least two said subjects of said game of chance to form a subject set and entrant is assigned a permutation for each of said subjects.

5. The method of claim 4, wherein said subject set comprises at least two designated weekends of football games played by teams of the National Football League.

6. The method of claim 1, wherein said subject of said game of chance comprises football games played by teams of the National Football League during a designated game week and step of establishing a number of participants is said subject of said game of chance comprises using the number of teams playing in the National Football League.

7. The method of claim 1, wherein said step of creating a record for each said permutation comprises creating said record in a computer database, wherein said step of assigning each said record a unique game record identifier comprises assigning said unique game record identifier to said record in said computer database, and wherein said step of providing the entrant with access to said permutation assigned to the entrant comprises directing the entrant to an internet web site where the entrant can access said corresponding permutation by entering the entrant's said unique game record identifier.

8. The method of claim 7, wherein said step of receiving an entrée fee from an entrant is accomplished by a processing entrant's credit card charge.

9. The method of claim 1, wherein said subject of said game of chance is a marathon and said step of establishing a number of participants comprises selecting prior year participants having a time less than a predetermined maximum.

10. The method of claim 9, wherein said step of establishing measured performance criteria relating to said subject of said game of chance comprises establishment of said selected participants' time for completion of said marathon.

11. The method of claim 1, wherein said step of establishing a number of participants whose measured performance will be combined for purposes of said game of chance comprises combining the measured performances of at least two participants.

12. The method of claim 1, wherein said step of receiving an entrée fee from an entrant is accomplished by a processing entrant's credit card charge.

13. The method of claim 12, wherein said processing of entrant's credit card charge occurs over the internet.

14. The method of claim 13, wherein said processing of entrant's credit card charge occurs over the internet.

15. The method of claim 1, wherein each entrant having a permutation containing said winning combination in any order receives a payout of the predetermined specified currency amount as a payout sum.

* * * * *